Patented Oct. 19, 1954

2,692,274

UNITED STATES PATENT OFFICE 2,692,274

PROCESS FOR CATALYTIC REDUCTION OF CARBON DIOXIDE WITH HYDROGEN

Herbert Kölbel, Homberg (Niederrhein), Kreis Moers, and Paul Ackermann, Moers, Kreis Moers, Germany, assignors to Rheinpreussen Aktiengesellschaft für Bergbau und Chemie, Homberg (Niederrhein), Germany, a German corporation No Drawing. Application May 4, 1950, Serial No. 160,104

5 Claims. (Cl. 260—449.6)

This invention relates to a process for catalytic reduction of carbon dioxide with hydrogen to higher aliphatic hydrocarbons or aliphatic compounds of oxygen.

It is a known method to reduce carbon dioxide with hydrogen into methane at atmospheric pressure in the presence of catalysts falling under Group 8 in the Periodical System of elements, as well as molybdenum and silver (see Franz Fischer, Hans Tropsch, and Paul Dilthey, Brennstoffchemie 6, 265/71 (1925)). A great number of experiments have also been made to obtain by catalytic reduction of carbon dioxide at atmospheric pressure synthesis products other than methane, such as oxygenous organic compounds or hydrocarbons having more than 1 C-atom per moleclue (see Herbert Koch and Hans Küster, Brennstoffchemie 14, 245/51, (1933); Hans Küster, Brennstoffchemie 17, 221, (1936); Franz Fischer, Theodor Bahr, and Albert Meusel, Brennstoffchemie 16, 466, (1935)). In these experiments the formation of hydrocarbons of higher molecular weight than methane has been observed when adding potassium compounds to the catalyst. Employing an hourly velocity of 80 normal liters of $CO_2 + H_2$ per liter of reactor for a run of 80 hours, the maximum yield per Ncbm of $CO_2 + H_2$ (N=at 760 mm. mercury pressure and 15° C.) obtained at 200° C., using a cobalt catalyst, was approximately 15 g. of hydrocarbons having more than 1 C-atom per molecule, which would be equal to a volume per time yield in "marketable" hydrocarbons of only 28.8 kg. per cbm of reactor in 24 hours. The total synthesis product predominantly consisted of methane, its content of higher hydrocarbons being as low as about 24% (Hans Küster, Brennstoffchemie 17, 221 (1936)).

It is also known to employ increased gas pressure in hydrogenating $CO_2$ to other products besides methane (see Franz Fischer and Hans Tropsch, Brennstoffchemie 5, 224 (1924)). Using KOH-impregnated coarse iron turnings as a catalyst, with temperatures exceeding 400° C. and gas pressures ranging from 136 to 8 atmospheres, 15 normal cubic meters per hour of a synthesis gas, containing $CO_2$ and $H_2$ at a volume ratio of 1:3, are passed through the reactor while recycling the exit gas at a circulating ratio of 5 volumes of recycle gas per volume of fresh feed gas. The total volume unit velocity per hour gas flow through the reactor is about 90. In relation to the quantity of catalyst used, only 0.03 Ncbm of synthesis gas is applied per hour per kilogram of iron. Under the conditions described, the formation of hydrocarbons higher than methane will not occur until the CO content of the gas has risen to 19.3% by volume due to primary reduction of $CO_2$ to CO. The presence in the synthesis gas of a major percentage of carbon monoxide which must first be formed by conversion of $CO_2$ with $H_2$ is therefore considered a basic condition for the formation of hydrocarbons. The yield of higher hydrocarbons and alcohols obtained by this known process is, however, but very low as compared with the quantity of methane formed.

The knowledge gained from this process afterwards led to the suggestion (see Herbert Koch and Hans Küster, Brennstoffchemie 14, 245 (1933)) to convert the $CO_2 + H_2$ gas mixture to $CO + H_2O$, using copper catalysts for instance, to such a degree that a synthesis gas is produced which is suitable for the known hydrogenation of CO in accordance with the Fischer-Tropsch method.

In another suggestion (see Badische Anilin- und Sodafabrik, German Patent 293,787 (1913)) for the catalytic synthesis of hydrocarbons under high gas pressure, it is emphasized that the use of carbon dioxide instead of carbon monoxide will heavily reduce the formation of the higher normally liquid hydrocarbons.

We have discovered a procedure permitting the conversion of carbon dioxide to higher molecular synthesis products containing as high as 80 per cent and sometimes even more of hydrocarbon products of the higher than $C_2$ series. This result is achieved in accordance with the invention by repeatedly, i. e. in several passes, passing a gas mixture containing about 0.2 to 1.5 volumes of carbon dioxide per volume of hydrogen through a hydrogenation zone in and out of contact with a hydrogenation catalyst therein containing as its base metal at least one of the elements of the 8th Group of the Periodic System, and containing at least 0.1 per cent to 6 per cent by weight of alkali compounds calculated as alkali oxide, preferably sodium, maintaining within said zone a temperature of about 150° C. to 380° C. and preferably 240° C. to 350° C. and a positive pressure of from 1 to 100 atmospheres and preferably 10 to 30 atmospheres in excess atmospheric, substantially maintaining the rate of gas flow of each gas passage through said hydrogenation zone at least at a velocity of from 100 to 5000 normal cubic meters per hour per cubic meter of catalyst space, thereby to obtain in each such passage only partial conversion of said $CO_2$, and substantially removing from the gas, between each two successive passages of said gas mixture, the water produced in the hydrogenation reaction. The repeated passing of the gas mixture may be for instance accomplished by recycling or employing several synthesis stages arranged in series, in such a way that in each gas passage only a relatively low percentage of the gas is converted, the water produced by conversion and synthesis being largely removed from the exit gas before the latter reenters a synthesis chamber.

When proceeding in accordance with the invention the synthesis temperature though comparatively high, is, within the reaction conditions specified, nevertheless below that at which appreciable amounts of methane are formed.

The removal of water may be accomplished by cooling and/or chemical or physical sorption. The use of chemical sorptives, substantially neutral in chemical reaction with respect to synthesis products, for instance, of the type of calcium chloride, or similar products, and physical adsorptives, acting by reason of surface activity, such as of the type of activated coal, alumina, silica-gel, bauxite, fuller's earth, bentonite, or the like, is preferred. Particularly the latter type adsorbents offer the advantage of simultaneously separating from the gas mixture some of the hydrocarbon material and especially such material of lower C series. The alkali metal compound useful for catalyst activity in accordance with the invention is preferably one of basic or alkaline reacting (in aqueous contact) type and includes particularly the sodium and potassium oxides, hydroxides, carbonates, silicates, phosphates, borates and the sodium and potassium salts of organic acids, especially of aliphatic acids like acetic acid and its homologues.

To carry out the process according to this invention, the catalyst may be applied either in the absence or presence of a liquid medium. Since in the hydrogenation of $CO_2$ the reaction heat per volume of $CO_2+H_2$ is by about a third lower than the reaction heat developed by an equal volume of $CO+H_2$ in the hydrogenation of CO, the well-known technical difficulties encountered in disposing of reaction heat and keeping the reaction temperature constant are considerably reduced in the process in accordance with our invention. It is possible to use the high gas velocities through the reactor provided in accordance with the invention whenever a fixed-bed granular catalyst is used in the absence of a liquid medium, and without the deposition of carbon reaching such a degree as to choke the reactor. In doing so, it is desirable to use the fixed-bed catalyst in a particle size of more than 1 mm. Within the scope of the invention, however, also a fixed-bed catalyst within a liquid medium may be used.

In the process described in this invention, it is especially advantageous to employ catalysts in a dry, fine-grained state with a particle size of less than 1 mm., which, under the conditions of a particularly high reactor space velocity of the gas of up to 5000 (Ncbm gas/hr. per cbm catalyst space) and more, corresponding to a linear stream velocity in the reactor of more than 10 cm. per second, are substantially maintained in turbulent motion. This will technically simplify the disposal of heat and greatly reduce the deposition of carbon and paraffin on the catalyst as compared with the known method of CO hydrogenation using this type of catalysts. By "Ncbm" we mean "normal cubic meters." (1 Ncbm=37.23 standard cubic feet.) By "cbm" we mean "cubic meters."

When employing catalysts surrounded by a liquid medium in the hydrogenation of $CO_2$ according to this invention, the percentage of higher molecular hydrocarbons in the total products will be 90% and more throughout. In addition, when using more heavily alkalized catalysts suspended in a liquid medium, products are obtained which predominantly consist of solid hydrocarbons. As opposed to the process employing a dry, dust-like catalyst, these high molecular products will not disturb the technical execution of the synthesis.

Wherever the expression "catalyst space" or one of similar import is used herein, it is intended to designate thereby the space occupied by the catalyst material when in substantially quiescent condition and including the space occupied by a "fixed-bed" catalyst, a catalyst material blowable into turbulent motion, and a suspension of catalyst in liquid.

One of the primary factors for conversion of a high percentage of the gas, according to this invention, is the removal from the reaction gas, during synthesis, of at least the major portion of the reaction water which is theoretically produced in a quantity of 400 g. per normal cubic meter of $CO_2+3H_2$. This is accomplished by converting only a portion of the gas at any one time, removing the reaction water, or at least the major portion thereof, from the partly converted gas and subjecting the remainder of the gas to at least one and preferably several more conversions with water removal before each passage through the reactor. The reaction gases, sometimes referred to as tail gases, may be largely freed from water by the well-known measures of cooling or chemical or physical sorption. Having been freed from water, the tail gases are preferably mixed with fresh synthesis gas before being subjected to further conversion. The tail gases as such or together with fresh gas may be recycled to the same reactor, or may be further converted in a second and, if required, in a third reactor using the multi-stage process substantially with water removal before each stage. Cooling of the rest or tail gas is suitably effected by indirect water cooling, the steam produced being used to heat up the gas freed from water prior to its entry into the synthesis apparatus.

*Example I*

A conventional CO hydrogenation iron catalyst obtained for instance by well-known oxidic iron reduction with hydrogen or carbon monoxide and hydrogen is used, containing, however, in relation to the iron content, about 0.5% of copper and 0.8% of $K_2CO_3$. This catalyst is placed in a pressure-proof reactor (lamellae or tube type) in a fine graular state with a particle size of less than 0.2 mm. and treated at 280–340° C. with synthesis gas of the following composition: 19.9% of $CO_2$; 0.4% CO; 58.3% $H_2$; 0.4% $CH_4$, and 21% $N_2$. The gas entering at the bottom of the reaction vessel under a pressure of 20 atmospheres is sent into the reactor at an hourly velocity through the reactor of approximately 100–250 normal liters per liter of catalyst space. Once synthesis is started, the fresh gas is continuously mixed with the threefold quantity of exit or tail gas from the same reactor. The exit gas issuing from the top of the reactor is cooled down to 50° C. or less by indirect water cooling, in which procedure the reaction water and the higher hydrocarbons are separated and drained. By means of a pressure-proof gas pump, part of the exit gas now almost free from water is returned to the synthesis gas inlet of the reactor where it is mixed with fresh synthesis gas and recycled to the catalyst.

A quantity of exit gas, corresponding to the contraction of gas volume during synthesis, is led over active coal, with or without previous expansion to atmospheric pressure, for the final production of the low molecular hydrocarbons ($C_3$–$C_5$).

At an average conversion of 85% $CO_2$ and 96% $H_2$ the following products are obtained:

|  | G. per Ncbm $CO_2$+$H_2$ |
|---|---|
| Methane, ethane, ethylene | 17 |
| $C_3$+$C_4$ hydrocarbons | 15 (including 76% of olefines) |
| Gasoline, distillation end point, 15–200° C. | 37 (including 74% of olefines) |
| Heavy gasoline, 200–320° C | 26 |
| Hydrocarbons above 320° C | 26 |
| Water-soluble alcohols $C_1$–$C_4$ | 11 |

The daily yield of hydrocarbons having 3 and more C-atoms per molecule and oxygenous organic products totals about 500–600 kg. per cubic meter of synthesis chamber.

*Example II*

A hydrogenation catalyst obtained in known manner by precipitation with soda of a solution of nitrate of iron (III), and subsequent reduction with $H_2$ or $CO$+$H_2$ is used. The same is prepared or adjusted, however, in accordance with conventional practice, to a per cent weight composition (based on Fe) of 0.5 Cu and 1 $K_2O$, and possesses an average particle size of 0.05–0.5 mm. This catalyst is placed in a synthesis apparatus which is subdivided to form 4 separate gas-tight chambers of the lamellae type of different volumes at the ratio of 20:16:13:11. The chambers are interconnected by gas pipes led over heat exchangers outside the reactor and provided with condensate separators.

Under a synthesis gas pressure of 20 atm. and at an initial temperature of 280–300° C., a synthesis gas free from carbon monoxide and containing approximately 20% $CO_2$ and 63% $H_2$ besides nitrogen and $CH_4$, is led into the first and biggest reaction chamber at a velocity through the reactor of 600 (Ncbm gas/hr. per cbm catalyst space). The exit gas is passed through the subsequent stages after removal of the reaction water before entering the next stage. Gas volume contraction throughout the four chambers totals about 60%. Over an operating period of 600 hours, with synthesis temperature being gradually increased to 320° C., 82% of the carbon dioxide applied are converted at the start and 75% at the end. In this process, one normal cubic meter of applied $CO_2$+$H_2$ will yield on an average 126 grs. of hydrocarbons of the following composition:

|  | Percent by weight |
|---|---|
| Methane, ethane, ethylene | 12 |
| $C_3$+$C_4$-hydrocarbons | 7 |
| Gasoline 20–200° C | 24 |
| Hydrocarbons 200–320° C | 21 |
| Hydrocarbons above 320° C | 33 |
| Alcohols $C_2$–$C_5$ | 3 |

The olefine content of the liquid products amounts to 74%. By extracting the high molecular products from the catalyst, the latter can be used for another 300 hours with an average carbon dioxide conversion of 72%.

Repeating Example II using substantially the same materials and reaction conditions except a suspension of said catalyst in a quantity of synthesis oil of the 300–340° C. distillation range equivalent to obtain a suspension containing about 20% by weight of iron and a gas velocity through the reactor of about 300 Ncbm/hr. per cbm suspension, good conversion results with somewhat better yields of the higher molecular hydrocarbon compounds were observed.

We claim:

1. A process for the catalytic conversion of carbon dioxide to produce a mixture of hydrocarbons and oxygenated hydrocarbons by hydrogenation which comprises: repeatedly passing a carbon dioxide-containing gas mixture substantially free of carbon monoxide in a plurality of passes through at least one hydrogenation zone in contact with a hydrogenation catalyst therein containing as its base metal at least one of the elements of the 8th Group of the Periodic System and at least 0.1 to 6 percent by weight of an alkali metal compound, calculated as alkali oxide, said gas mixture containing about 0.2 volume to 1.5 volumes of carbon dioxide per volume of hydrogen; maintaining within each hydrogenation zone a temperature of about 150° C. to 380° C. and a pressure of from one to 100 atmospheres; maintaining a rate of gas flow of each gas passage through each hydrogenation zone at a velocity of substantially 100 to 5000 normal cubic meters of gas per hour per cubic meter of catalyst space, thereby to obtain in each passage only partial conversion of the total carbon dioxide; and removing from the gas between each two successive passages water produced in the hydrogenation reaction.

2. A process in accordance with claim 1 in which said temperature is maintained at about 240° C. to 350° C., and in which said contacting pressure is maintained at about 10 to 30 atmospheres in excess of atmospheric.

3. A process in accordance with claim 2 in which said water removal includes contact with a member of the group consisting of chemical sorptives, substantially neutral in chemical reaction with respect to synthesis products, of the type of calcium chloride, and physical adsorptives, acting by reason of surface activity, such as of the type of activated coal, alumina, silica-gel, bauxite, fuller's earth, bentonite, and in which there is simultaneously obtained by such contact part of the synthesis products.

4. A process in accordance with claim 1 in which said temperature is maintained at about 240° C. to 350° C., in which said pressure is maintained at about 10 to 30 atmospheres in excess of atmospheric, in which said catalyst base metal is iron, in which said repeated passing includes repeatedly recycling at least a portion of the exit gases of each such passage, and in which said repeated passing includes passing said gas through the stages of a multiple stage hydrogenation zone.

5. A process according to claim 3 in which said catalyst base metal is iron and in which said repeated passing includes repeatedly recycling at least a portion of the exit gas of each such passage, and in which said repeated passing includes passing said gas through the stages of a multiple stage hydrogenation zone.

References Cited in the file of this patent

UNITED STATES PATENTS

| Number | Name | Date |
|---|---|---|
| 2,213,415 | Slatineanu | Sept. 3, 1940 |
| 2,248,099 | Linckh et al. | July 8, 1941 |
| 2,257,293 | Dreyfus | Sept. 30, 1941 |
| 2,585,981 | Watson | Feb. 19, 1952 |

FOREIGN PATENTS

| Number | Country | Date |
|---|---|---|
| 337,014 | Great Britain | Oct. 24, 1930 |